United States Patent [19]
DeBiasi et al.

[11] Patent Number: 5,745,534
[45] Date of Patent: Apr. 28, 1998

[54] METHOD AND APPARATUS FOR DATA COMMUNICATION

[75] Inventors: Charles James DeBiasi, Plymouth Township; Vikas Tuteja, Novi; Zeljko Deljevic, Westland; John Francis Renehan, South Lyon, all of Mich.

[73] Assignee: Ford Motor Company, Dearborn, Mich.

[21] Appl. No.: 657,394

[22] Filed: Jun. 4, 1996

Related U.S. Application Data

[63] Continuation of Ser. No. 353,601, Dec. 12, 1994, abandoned.

[51] Int. Cl.⁶ ........................................... H04L 7/00
[52] U.S. Cl. ........................ 375/354; 322/7; 322/99
[58] Field of Search ............................ 375/259, 238, 375/358, 295, 316, 354, 355; 322/7, 14, 29; 318/811; 364/424.05, 424.01; 307/10.1

[56] References Cited

U.S. PATENT DOCUMENTS

| | | | |
|---|---|---|---|
| 3,808,188 | 4/1974 | Barrett | 60/364 |
| 4,327,441 | 4/1982 | Bradshaw | 375/364 |
| 4,409,534 | 10/1983 | Bose | 318/811 |
| 4,608,630 | 8/1986 | Schott | 364/228.3 |
| 4,713,841 | 12/1987 | Porter et al. | 375/328 |
| 4,734,900 | 3/1988 | Davie | 369/59 |
| 4,980,884 | 12/1990 | Chang | 370/9 |
| 5,038,728 | 8/1991 | Yoshida et al. | 123/198 R |
| 5,140,256 | 8/1992 | Hara | 324/76.12 |
| 5,373,196 | 12/1994 | Faley | 307/46 |

*Primary Examiner*—Tesfaldet Bocure
*Attorney, Agent, or Firm*—Mark S. Sparschu

[57] ABSTRACT

A voltage regulation system for an automobile comprises a voltage regulator and a powertrain control module. The powertrain control module has a quartz crystal as its time base, while the voltage regulator has a less-expensive, though more environmentally robust resistive-capacitive (RC) oscillator. The voltage regulator and powertrain control module communicate between one another using pulse-width modulation. Drift in the frequency of the RC oscillator in the voltage regulator is recognized through the powertrain control module's measurement of the frequency of the signal sent by the voltage regulator. The powertrain control module adjusts the frequency of the signal it sends to the voltage regulator, assuring that the drift in frequency of the RC oscillator does not inhibit accurate PWM communications between the two devices.

14 Claims, 1 Drawing Sheet

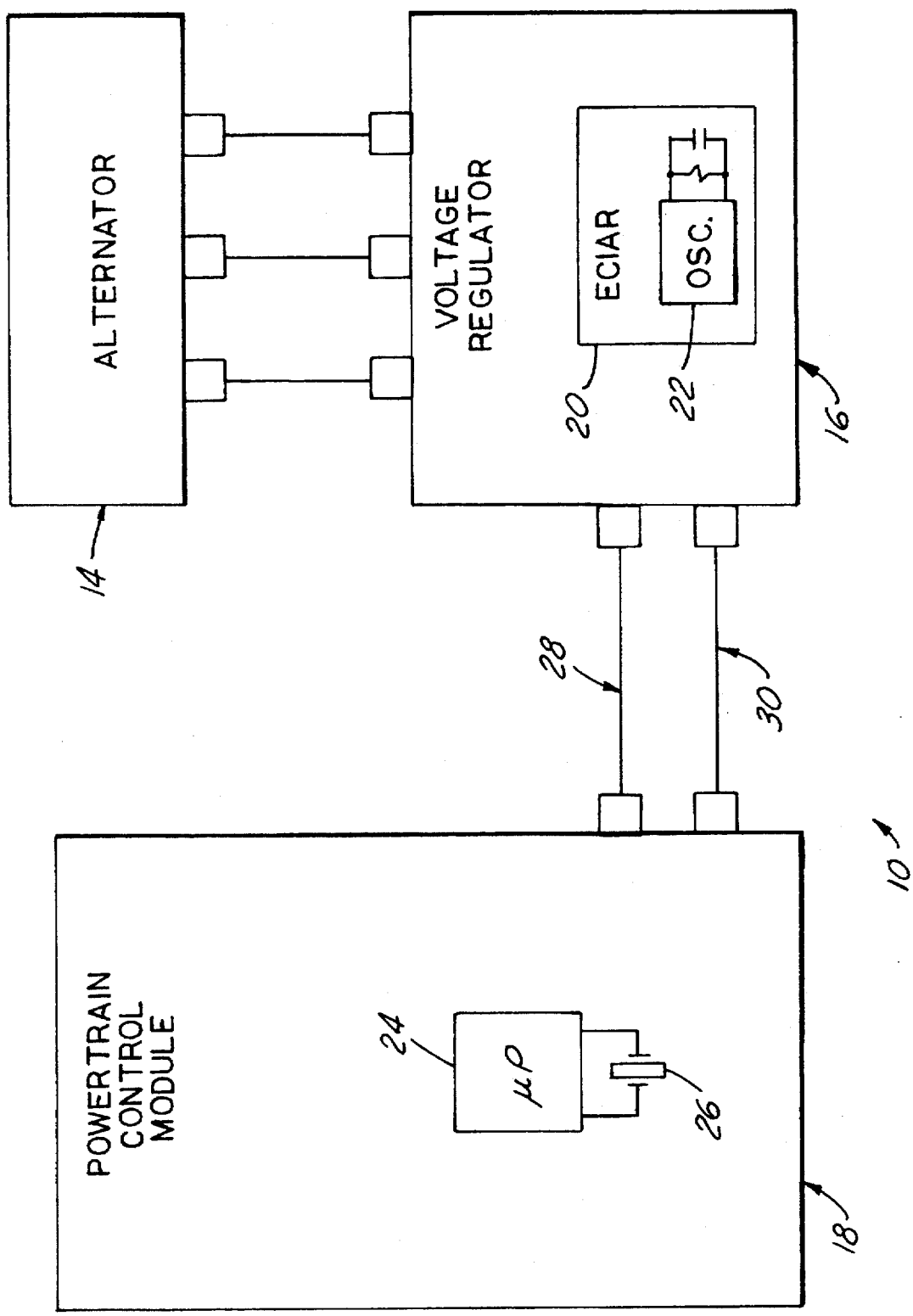

5,745,534

METHOD AND APPARATUS FOR DATA COMMUNICATION

This is a continuation of application Ser. No. 08/353,601 filed Dec. 12, 1994 abandoned.

BACKGROUND OF THE INVENTION

1. Field of the Invention

The present invention relates generally to data communication, and more specifically to data communication in a system with a device having a time base with a parameter which varies over time.

2. Description of the Related Art

A common method of data communication is pulse-width modulation (PWM). In pulse-width modulation, a fixed frequency signal is normally used. The data to be communicated with this signal is encoded as a "duty cycle" (i.e., a percentage of the total period of the signal that the signal is in its ON state).

Devices which communicate using pulse-width modulation usually employ some form of time base to generate and decode the pulse-width-modulated signals involved. Such time bases can vary from high-accuracy, high-stability time bases such as quartz crystals to lower-cost time bases such as resistive-capacitive (RC) oscillators. Such lower-cost time bases may also be able to withstand more severe environments (e.g., near the engine of an automobile) than other time bases.

Lower-cost time bases can exhibit some drift in frequency over time and temperature. Those skilled in the art recognize that such drift can pose a significant concern to PWM communication. As a result, a method to compensate for drift in frequency, while still taking advantage of the lower cost and potentially superior environmental durability of lower-cost time bases, will provide advantages over the prior art.

SUMMARY OF THE INVENTION

The present invention provides a method for data communication between a first device and a second device, each device configured to transmit a signal to the other device. The method comprises the step of measuring a parameter of the signal transmitted by the first device. The method further includes the step of adjusting the corresponding parameter of the signal transmitted by the second device in response to the measured parameter.

The present invention also provides an apparatus adapted for data communication, the apparatus comprising a first electronic device and a second electronic device, the first electronic device and the second electronic device each adapted to transmit a signal to the other device. The second electronic device further comprises means for measuring a parameter of the signal transmitted by the first electronic device and means for adjusting the corresponding parameter of the signal transmitted by the second device in response to the measured parameter.

The present invention allows the use of relatively less expensive and potentially more environmentally robust oscillators in pulse-width modulation. In doing so, the invention provides advantages over the prior art.

BRIEF DESCRIPTION OF THE DRAWING

The FIGURE is a system 10 according to one embodiment of the present invention.

DETAILED DESCRIPTION OF THE PREFERRED EMBODIMENT

Referring to the FIGURE, a system 10 according to one embodiment of the present invention will be described. The FIGURE illustrates a portion of the system described in pending U.S. patent application Ser. No. 08/270,570, filed Jul. 5, 1994, now issued as U.S. Pat. No. 5,481,176 on Jan.2,1996. The entire disclosure of that application is hereby incorporated by reference.

System 10 comprises alternator 14, the voltage of which is controlled by voltage regulator 16. Voltage regulator 16 comprises an integrated circuit 20, called an "Externally-Controlled Integral Alternator Regulator" (ECIAR), manufactured by Motorola. Within integrated circuit 20 is a resistive-capacitive (RC) oscillator.

System 10 further comprises powertrain control module 18. Powertrain control module 18 is preferably an EEC-IV controller from Ford Motor Company, although other controllers can be substituted. Powertrain control module 18 is preferably a microprocessor-based device which contains sufficient microcomputer resources (memory, throughput, registers, inputs, outputs and the like) to perform the functions ascribed to it herein. Powertrain control module 18 has responsibility for a number of engine management functions including idle control, as are numerous powertrain control modules known to the art. In the preferred embodiment of the present invention, powertrain control module 18 further determines the voltage at which voltage regulator 16 is to control the output of alternator 14.

Powertrain control module 18 contains microprocessor 24, preferably an Intel 8061 microprocessor. Coupled to microprocessor 24 is crystal 26, the time base for the functions performed by microprocessor 24.

Connecting voltage regulator 16 and powertrain control module 18 are two wires. Load indicator line 28 provides a pulse-width-modulated (PWM) signal from voltage regulator 16 to powertrain control module 18, the signal being generated by integrated circuit 20. The duty cycle of the signal on load indicator line 28 provides powertrain control module 18 with a measure of the mechanical torque applied by alternator 14 on the engine which drives it. For the purposes for which the signal is used in this disclosure, the signal preferably has a nominal frequency of 150 hertz.

Regulator control line 30 is used by powertrain control module 18 to provide a command to voltage regulator 16 indicating the output voltage at which voltage regulator 16 should control alternator 14. The signal provided by powertrain control module 18 to voltage regulator 16 on regulator control line 30 is preferably pulse-width modulated, the duty cycle being a function of the desired output voltage command from powertrain control module 18 to voltage regulator 16. This PWM signal is generated by microprocessor 24. The frequency of this signal is selectable by loading appropriate values in appropriate memory locations. The nominal frequency of this signal is preferably proportional to the frequency on load indicator line 28 and more preferably equal to that frequency (150 hertz).

Oscillator 20 within voltage regulator 16, being a relatively inexpensive R-C oscillator, is susceptible to variation in frequency over time. Further, the frequency can vary over temperature. These variations can interfere with accurate communication between powertrain control module 18 and voltage regulator 16.

This interference can occur because oscillator 22 is the time base for decoding by voltage regulator 16 of the PWM signal on regulator control line 30. (Oscillator 22 is also the time base for generation by voltage regulator 16 of the PWM signal on load indicator line 28.) In decoding the signal received on regulator control line 30, integrated circuit 20 uses its oscillator 22 as input to a counter to measure how long the signal on regulator control line 30 remains in its ON state. So, if oscillator 22 increases in frequency, for example, the counter will count higher for a given ON time of the signal on regulator control line 30. This will make voltage regulator 16 think that powertrain control module 18 is commanding a higher voltage than is actually the case.

Such a situation is prevented by an algorithm in powertrain control module 18. Powertrain control module 18 measures the period of the signal it receives on load indicator line 28 from voltage regulator 16. The measurement is performed using the following formula:

$$T = t_2 - t_1,$$

where $t_1$ is the time at which a rising edge occurs, $t_2$ is the time at which the subsequent rising edge occurs, and T is the resultant period of the signal on load indicator line 28. The frequency of the signal on load indicator line 28 is then the reciprocal of the period. (Because of the one-to-one relationship between frequency and period, frequency and period are equivalently appropriate parameters to measure for the purposes of this embodiment of the present invention.) Because oscillator 22 is the time base for the generation of this signal, drifting of the frequency or period of the signal indicates drifting of the frequency of oscillator 22.

If powertrain control module 18 recognizes that the frequency or period of the signal on load indicator line 28 is drifting, powertrain control module 18 adjusts the frequency of the signal generated by microprocessor 24 and transmitted on regulator control line 30 in response to that frequency. Preferably, the frequency of the signal transmitted on regulator control line 30 is adjusted to be proportional to the frequency of the signal on load indicator line 28. More preferably, the frequency of the signal transmitted on regulator control line 30 is adjusted to be equal to the frequency of the signal on load indicator line 28.

So, consider the same example as above. If oscillator 22 increases in frequency, the frequency of the signal on load indicator line 28 will increase as well (because oscillator 22 is the time base for encoding the signal on load indicator line 28). Powertrain control module 18 will recognize the increased frequency and will accordingly increase the frequency of the signal on regulator control line 30. Thus, for a given duty cycle, the ON time of the signal on regulator control line 30 will decrease. This shorter ON time counteracts the decoding problem described above, caused by the increased frequency of oscillator 22 (the decoding time base for voltage regulator 16).

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A method for data communication between a voltage regulator and a powertrain controller, said voltage regulator configured to transmit a first signal to said powertain controller and said powertrain controller configured to transmit a second to said voltage regulator, said method comprising the steps of:

measuring a frequency of said first signal; and adjusting a frequency of said second signal in response to said measured frequency.

2. A method as recited in claim 1, wherein the step of adjusting a frequency of said second signal further comprises setting said frequency of said second signal proportional said frequency of said first signal.

3. A method as recited in claim 2, wherein the step of adjusting a frequency of said second signal further comprises setting said frequency of said second signal equal to said frequency of said first signal.

4. An apparatus adapted for data communication, said apparatus comprising:

a first electronic device;

a second electronic device;

wherein said first electronic device is adapted to transmit a first signal to said second electronic device and said second electronic device is adapted to transmit a second signal to said first electronic device;

wherein said second electronic device further comprises means for measuring a frequency of said first signal and means for adjusting a frequency of said second signal in response to said measured frequency;

wherein said means for adjusting a frequency of said second signal further comprises means for setting said frequency of said second signal equal to said frequency of said first signal;

wherein said second device comprises a crystal as a time base for said second signal; and wherein said first device comprises an R-C oscillator as a time base for said first signal.

5. An apparatus as recited in claim 4, wherein:

said first device is a voltage regulator for an automotive alternator; and said second device is a powertrain control module.

6. A method for data communication between a first device and a second device, said first device configured to transmit a first signal to said second device and said second device configured to transmit a second signal to said first device, said method comprising the steps of:

transmitting said second signal using a first oscillator as a time base;

transmitting said first signal using a second oscillator as a time base, said second oscillator having lesser frequency stability than said first oscillator;

measuring a frequency of said first signal; and adjusting a frequency of said second signal in response to said measured frequency;

wherein the step of adjusting a frequency of said second signal further comprises setting said frequency of said second signal proportional to said frequency of said first signal.

7. A method as recited in claim 6, wherein:

transmitting said second signal using a first oscillator as a time base further comprises the step of using a crystal oscillator as said first oscillator; and transmitting said first signal using a second oscillator as a time base further comprises the step of using an R-C oscillator as said second oscillator.

8. A method for data communication between a first device and a second device, said first device configured to transmit a first signal to said second device and said second device configured to transmit a second signal to said first device, said method comprising the steps of:

transmitting said second signal using a first oscillator as a time base;

transmitting said first signal using a second oscillator as a time base, said second oscillator having lesser frequency stability than said first oscillator;

measuring a frequency of said first signal; and adjusting a frequency of said second signal in response to said measured frequency.

9. A method as recited in claim 8, wherein:

transmitting said second signal using a first oscillator as a time base further comprises the step of using a crystal oscillator as said first oscillator; and transmitting said first signal using a second oscillator as a time base further comprises the step of using an R-C oscillator as said second oscillator.

10. A method for data communication between a first device and a second device, said first device configured to transmit a first signal to said second device and said second device configured to transmit a second signal to said first device, said method comprising the steps of:

transmitting said second signal using a crystal oscillator as a time base;

transmitting said first signal using an R-C oscillator as a time base;

measuring a frequency of said first signal; and adjusting a frequency of said second signal in response to said measured frequency.

11. A method for data communication between a first device and a second device, said first device configured to transmit a first signal to said second device and said second device configured to transmit a second signal to said first device, said method comprising the steps of:

transmitting said second signal using a crystal oscillator as a time base;

transmitting said first signal using an R-C oscillator as a time base;

measuring a frequency of said first signal; and adjusting a frequency of said second signal in response to said measured frequency;

wherein the step of adjusting a frequency of said second signal further comprises setting said frequency of said second signal equal to said frequency of said first signal.

12. An apparatus adapted for data communication, said apparatus comprising:

a first electronic device;

a second electronic device;

wherein said first electronic device is adapted to transmit a first signal to said second electronic device and said second electronic device is adapted to transmit a second signal to said first electronic device;

wherein said second electronic device further comprises means for measuring a frequency of said first signal and means for adjusting a frequency of said second signal in response to said measured frequency;

wherein said second electronic device contains a first oscillator as a time base for said second signal; and wherein said first electronic device contains a second oscillator of lesser frequency stability than said first oscillator as a time base for said first signal.

13. An apparatus as recited in claim 12, wherein: said first oscillator is a crystal oscillator; and said second oscillator is an R-C oscillator.

14. An apparatus adapted for data communication, said apparatus comprising:

a first electronic device;

a second electronic device;

wherein said first electronic device is adapted to transmit a first signal to said second electronic device and said second electronic device is adapted to transmit a second signal to said first electronic device;

wherein said second electronic device further comprises means for measuring a frequency of said first signal and means for adjusting a frequency of said second signal in response to said measured frequency;

wherein said first electronic device contains an R-C oscillator as a time base for said first signal; and wherein said second electronic device contains a crystal oscillator as a time base for said second signal.

* * * * *